C. W. Baldwin.
Preparing Peat.
N° 72357 — Patented Dec. 17, 1867

Witnesses:
Fred. Curtis.
Edmund H. Keown

Inventor:
C. W. Baldwin

United States Patent Office.

CYRUS W. BALDWIN, OF BOSTON, MASSACHUSETTS.

Letters Patent No. 72,357, dated December 17, 1867.

IMPROVED APPARATUS FOR PREPARING PEAT.

The Schedule referred to in these Letters Patent and making part of the same.

TO ALL TO WHOM THESE PRESENTS SHALL COME:

Be it known that I, CYRUS W. BALDWIN, of Boston, in the county of Suffolk, and State of Massachusetts, have invented a New Process of Preparing Peat; and do hereby declare the following to be a full, clear, and exact description of the same, due reference being had to the accompanying drawings, making part of this specification, and in which—

Figure 4:
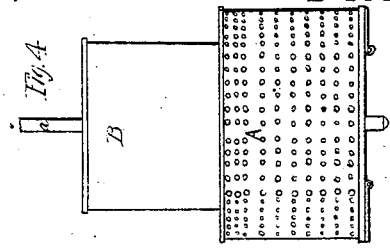
Figure 3:
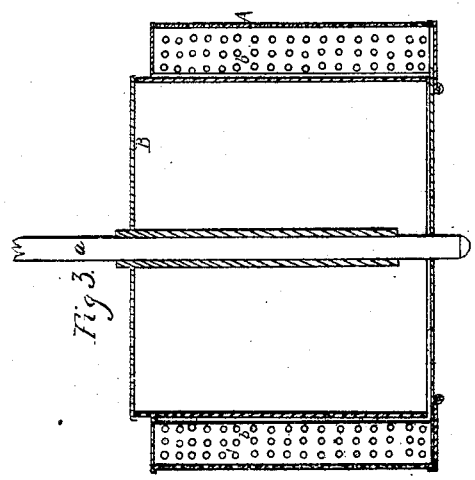
Figure 2:
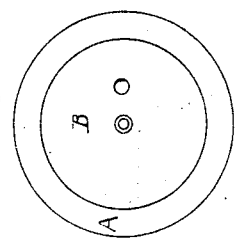
Figure 1:
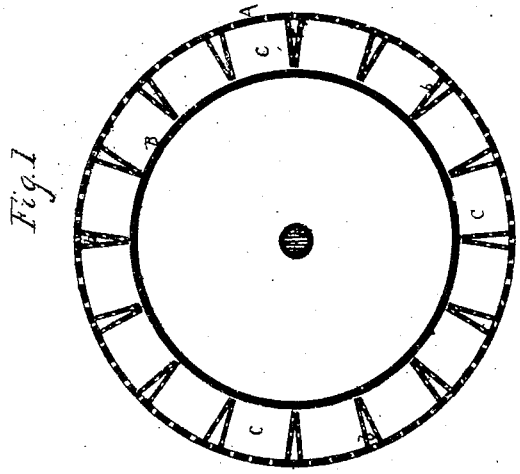

Figure 1 is a horizontal section.
Figure 2 a plan.
Figure 3 a vertical and transverse section.
Figure 4 a side elevation.

The consumption of the well-known article of peat as fuel is becoming very extensive, and various devices have been invented to prepare it in a proper manner and form it into proper shape for the purpose. Heretofore all such devices have been complicated in construction, and require more or less time in the preparation of the peat, and are universally admitted to be unequivocal failures, the great obstacle in the way of success being the difficulty of extracting the water from the peat, which usually amounts to about seventy-five per cent.

The object of my present invention is to prepare the peat properly for use in a very expeditious manner, and to greatly economize the cost of construction of the machinery.

The invention consists in extracting the liquid part of the peat, and pressing such peat into bars or blocks for use, by the employment of centrifugal force, either with or without the aid of heated air.

In the accompanying drawings, above referred to, as illustrating my invention, A denotes an upright cylindrical drum or tank, closed at bottom, and supported by a vertical shaft, $a$, in such manner as to be freely revolved therewith. The circumference of the drum is foraminous, and has within it, and projecting inward a short distance, a series of hollow perforated partitions, $b\ b\ b$, cone-shaped, in horizontal section, and with their sides of such an angle that the spaces $c\ c\ c$ between such partitions shall be rectangular in shape, in order to allow of the removal of the blocks or bars of peat which have been pressed into them by the action of centrifugal force.

The above-described revolving drum constitutes the main portion of the machinery for carrying out my invention, and its operation is extremely simple. The peat, in its natural state from the bog, is introduced into the drum, which is to be put into rapid revolution. The centrifugal force generated by this revolution has the effect of forcing from such peat its liquid portion, and also of forcing such peat into the spaces between the divisional partitions with sufficient force to form it into dry bars or blocks, of sufficient tenacity and hardness to be transported. Heated air may be introduced into the revolving drum for the purpose of facilitating the drying of the peat.

Among the accessories of my invention I have contemplated the employment with the revolving drum of an inverted cylindrical vessel or bell, B, made to slide freely upon the shaft and within the drum, as represented in the drawings, the object of such bell being to afford a convenient means of introducing heated air into the drums, as well as, when lowered within the drum, to cut off and remove any excrescences or masses of peat projecting toward the centre of the drum, which, by making one side heavier than the other, would tend to interfere with the rapid revolution of it, or cause an unequal or one-sided motion of it.

In the use of this bell B, it is intended to be placed above the drum A, and with its lower edge within and closing the mouth of such drum. Hot air from a suitable source, from 250° to 500° Fahrenheit, is to be introduced into the said bell, and, by the centrifugal force of the revolving drum, will draw through the mass of peat and through the foraminous walls of the drum and the partitions $b\ b\ b$, thus converting the water of the peat into steam, and causing a very rapid desiccation of such peat. This same centrifugal force also forces the peat, as before observed, into the spaces $c\ c\ c$, from whence they may be removed, when dry, in the shape of bars ready for use.

Openings, provided with valves, should be made in the bottom of the drum A, for escape of the bars of peat after being dried. Transverse bars or shelves may be disposed between the partitions $b\ b\ b$, for the purpose of dividing the bars of peat into smaller blocks. The bell B may be lowered within the drum permanently; in this case its circumference should be foraminous.

Having now described my invention, and the manner in which the same is or may be carried into effect, what I claim, and desire to secure by Letters Patent, is—

1. The method, herein described, of effecting simultaneously the desiccation of peat, and its formation into bars or blocks, by subjecting the said peat to the action of centrifugal force, within a vessel constructed and operating substantially as shown and specified.

2. The peat-receiving vessel, and diaphragm or partitions within the same, in combination with the bell B, substantially as and for the purposes shown and specified.

C. W. BALDWIN.

Witnesses:
    EDMUND H. HEWINS,
    CHAS. L. TURNER.